(12) United States Patent
Kishiyama et al.

(10) Patent No.: US 9,913,294 B2
(45) Date of Patent: Mar. 6, 2018

(54) RADIO COMMUNICATION SYSTEM AND TERMINAL DEVICE

(71) Applicant: NTT DOCOMO, INC., Tokyo (JP)

(72) Inventors: Yoshihisa Kishiyama, Tokyo (JP); Qin Mu, Beijing (CN); Liu Liu, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 175 days.

(21) Appl. No.: 14/889,329

(22) PCT Filed: Apr. 14, 2014

(86) PCT No.: PCT/JP2014/060621
§ 371 (c)(1),
(2) Date: Nov. 5, 2015

(87) PCT Pub. No.: WO2014/181646
PCT Pub. Date: Nov. 13, 2014

(65) Prior Publication Data
US 2016/0100431 A1    Apr. 7, 2016

(30) Foreign Application Priority Data

May 8, 2013  (JP) ................................ 2013-098878

(51) Int. Cl.
*H04W 74/08* (2009.01)
*H04B 17/318* (2015.01)
(Continued)

(52) U.S. Cl.
CPC .......... *H04W 74/08* (2013.01); *H04B 17/318* (2015.01); *H04W 4/005* (2013.01); *H04L 5/0053* (2013.01)

(58) Field of Classification Search
CPC .... H04W 74/08; H04W 4/005; H04B 17/318; H04L 5/0053
See application file for complete search history.

(56) References Cited

U.S. PATENT DOCUMENTS

| 2014/0098761 | A1* | 4/2014 | Lee | ..................... | H04W 74/006 370/329 |
| 2015/0236932 | A1* | 8/2015 | Yu | ......................... | H04W 24/08 370/252 |
| 2015/0289291 | A1* | 10/2015 | Liu | ...................... | H04W 74/08 370/329 |

OTHER PUBLICATIONS

International Search Report issued in PCT/JP2014/060621 dated Jul. 8, 2014 (1 page).
(Continued)

*Primary Examiner* — Christopher Grey
(74) *Attorney, Agent, or Firm* — Osha Liang LLP

(57) ABSTRACT

A radio communication system includes a radio base station and a terminal device. The radio base station and the terminal device share correspondence information about subsets of preamble sequences obtained by segmenting preamble sequences available in the radio communication systems into groups, each of the subsets being associated with a received signal level at the terminal device and a number of repetitions for transmitting the preamble sequences of each of the subsets. Based upon a receive level of a signal transmitted from the radio base station, the terminal device selects a subset corresponding to the receive level by referring to the correspondence information and transmits a preamble sequence included in the selected subset at the number of repetitions associated with the selected subset.

13 Claims, 10 Drawing Sheets

(51) Int. Cl.
*H04W 4/00*  (2018.01)
*H04L 5/00*  (2006.01)

(56)  References Cited

OTHER PUBLICATIONS

Written Opinion of the International Searching Authority issued in PCT/JP2014/060621 dated Jul. 8, 2014 (3 pages).
ETSI TS 136 213 V10.1.0; "LTE; Evolved Universal Terrestrial Radio Access(E-UTRA); Physical layer procedures (3GPP TS 36.213 version 10.1.0 Release 10)"; Apr. 2011; (2 pages).
3GPP TS 36.211 V11.2.0; "3rd Generation Partnership Project; Technical Specification Group Radio Access Network; Evolved Universal Terrestrial Radio Access (E-UTRA); Physical Channel and Modulation (Release 11)"; Feb. 2013 (11 pages).

* cited by examiner

FIG.4

| SUBSETS OF PREAMBLE SEQUENCES | THE NUMBER OF REPETITIONS (PREAMBLE, MSG2, MSG3, MSG4) | RSRP RANGE | REMARKS |
|---|---|---|---|
| SUBSET 1 PREAMBLE INDEXES [1-32] | 1 | >X1 | PREAMBLE FOR LEGACY UE AND MTC-UE WITH LESS NEED FOR COVERAGE ENHANCEMENT |
| SUBSET 2 PREAMBLE INDEXES [33-40] | 10 | [X10, X1) | PREAMBLE FOR MTC-UE WITH NEED FOR COVERAGE ENHANCEMENT |
| ..... | ..... | ..... | |
| SUBSET n PREAMBLE INDEXES [60-64] | 100 | [X100, X90) | |

| SUBSETS OF PREAMBLE SEQUENCES | THE NUMBER OF REPETITIONS | RSRP RANGE |
|---|---|---|
| SUBSET 1 PREAMBLE INDEXES [1-32] | 1 | >X1 |
| SUBSET 2 PREAMBLE INDEXES [33-48] | 10 | [X10, X1) |
| SUBSET 3 PREAMBLE INDEXES [49-59] | 20 | [X20, X10) |
| SUBSET 4 PREAMBLE INDEXES [60-64] | 30 | [X30, X20) |

FIG.10

| 42a | 42b | 42c | 42d |
|---|---|---|---|
| SUBSETS OF PREAMBLE | THE NUMBER OF REPETITIONS FOR Msg2 AND Msg4 | RSRP RANGE | THE NUMBER OF REPETITIONS FOR PREAMBLE AND Msg3 |
| SUBSET 1 PREAMBLE INDEXES [1-32] | 1 | >X1 | 1 |
| SUBSET 2 PREAMBLE INDEXES [33-48] | 10 | [X10, X1) | $10 - \left\lfloor \dfrac{RSRP - X10}{\Delta_1} \right\rfloor$ |
| SUBSET 3 PREAMBLE INDEXES [49-59] | 20 | [X20, X10) | $20 - \left\lfloor \dfrac{RSRP - X20}{\Delta_2} \right\rfloor$ |
| SUBSET 4 PREAMBLE INDEXES [60-64] | 30 | [X30, X20) | $30 - \left\lfloor \dfrac{RSRP - X30}{\Delta_3} \right\rfloor$ |

$\Delta_1 = \dfrac{X1 - X10}{9}$  $\Delta_2 = \dfrac{X10 - X20}{9}$  $\Delta_3 = \dfrac{X20 - X30}{9}$

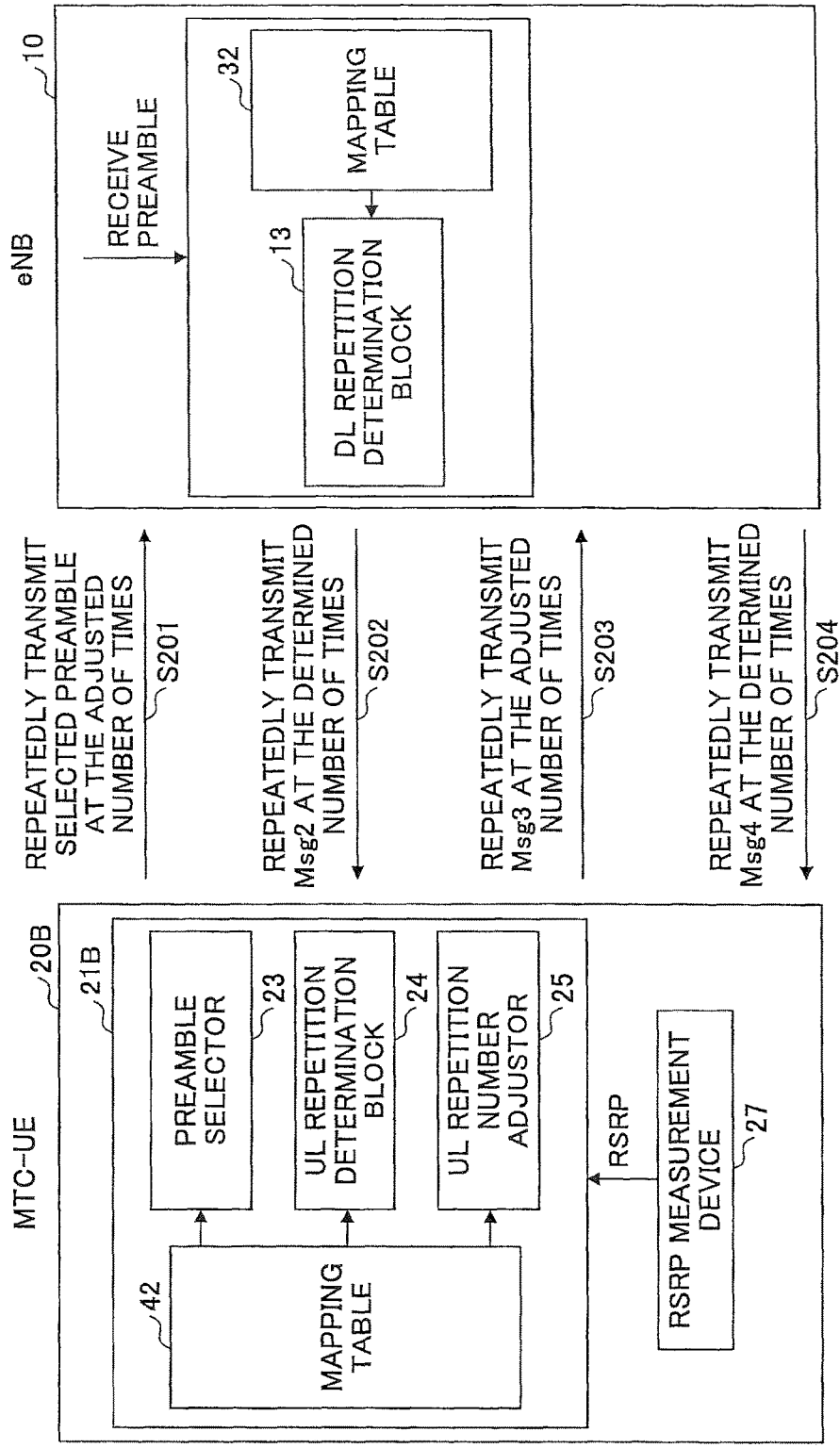

RADIO COMMUNICATION SYSTEM AND TERMINAL DEVICE

TECHNICAL FIELD

The present invention relates to a radio communication technology, and more particularly, to a radio communication system and a terminal device capable of enhancing random access channel coverage.

BACKGROUND ART

Machine-to-machine communication that supports automated or self-sustained communication between terminal devices without human intervention is being developed. Machine-to-machine communication is also named Machine Type Communication (MTC) at the Third Generation Partnership Projection (3GPP). In 3GPP specification Release 11, network optimization functions for MTC devices have been discussed. In Release 12, coverage enhancement to resist building penetration losses is being discussed.

Coverage enhancement is needed for various channels such as shared channel (SCH), physical broadcast channel (PBCH), physical random access channel (PRACH), physical downlink control channel (PDCCH), physical downlink shared channel (PDSCH), physical uplink shared channel (PUSCH), or physical uplink control channel (PUCCH).

There are a number of types of MTC devices. Some devices such as gas meters, electricity meters, or temperature or moisture sensors transmit data at regular intervals. Some devices are designed to transmit data when a particular event has occurred. In order to allow arbitrary MTC devices to quickly establish radio links regardless of device types, locations, or the environment, random access coverage enhancement is particularly of importance.

To enhance the coverage, it may be conceived to transmit the same information item repeatedly in the time domain. Techniques called automatic retransmission request (ARQ) and hybrid-ARQ combined with error correction are employed on PUCCH. In ARQ, if no acknowledge (ACK) message is received at a sender side within a predetermined time period after transmission of a data frame, the same data frame is transmitted repeatedly up to a predetermined number of times. See, for example, non-patent document 1 listed below.

It is also proposed to transmit a long preamble format at PRACH. See, for example, non-patent document 2 listed below. A technique for applying hybrid-ARQ to a part of the random access procedure is also known.

LIST OF PRIOR ART DOCUMENTS

Non-patent Document 1: 3GPP TS36.213, 10.1.4 HARQ-ACK Repetition
Non-patent Document 2: 3GPP TS36.211, 5.7 Physical random access channel

SUMMARY OF THE INVENTION

Technical Problem to be Solved

It is an objective of the invention to provide a radio communication system that can support coverage enhancement for random access from terminal devices, and a terminal device used in the radio communication system.

Means for Solving the Problem

In one aspect of the invention, a radio communication system includes a radio base station and a terminal device, wherein the radio base station and the terminal device are configured to share correspondence information about subsets of preamble sequences obtained by segmenting preamble sequences available in the radio communication systems into groups, each of the subsets being associated with a received signal level at the terminal device and a number of repetitions for transmitting the preamble sequences of each of the subsets, and wherein the terminal device is configured to, based upon a receive level of a signal transmitted from the radio base station, select a subset corresponding to the receive level by referring to the correspondence information and transmit a preamble sequence included in the selected subset at the number of repetitions associated with the selected subset.

In another aspect of the invention, a terminal device used in a radio communication system has a measurement device configured to measure signal strength of a signal transmitted from a radio base station, a table configured to describe subsets of preamble sequences obtained by segmenting preamble sequences available in the radio communication system into groups, each of the subsets being associated with a received signal strength and a number of repetitions for transmitting the preamble sequences included in each of the subsets, a controller configured to select a subset associated with the received signal strength based upon a measured signal strength and determine a number of repetitions for transmitting a preamble sequence selected from the subset, by referring to the table, and a communication device configured to transmit the selected preamble sequence at the determined number of repetitions.

Advantageous Effect of the Invention

With the above-described structure, channel coverage for random access from a terminal device is enhanced.

BRIEF DESCRIPTION OF THE DRAWINGS

FIG. 4 illustrates an example of a mapping table in which subsets of preamble sequences are associated with corresponding numbers of repetitions of transmission;

FIG. 7 is a diagram for explaining how the random access channel coverage is further enhanced according to a second embodiment;

FIG. 10 illustrates an example of a mapping table used in the second embodiment; and FIG. 11 illustrates exemplified structures of an MTC device and a radio base station (eNB), as well as a random access procedure, according to the second embodiment.

EMBODIMENTS TO CARRY OUT THE INVENTION

Figure 1:
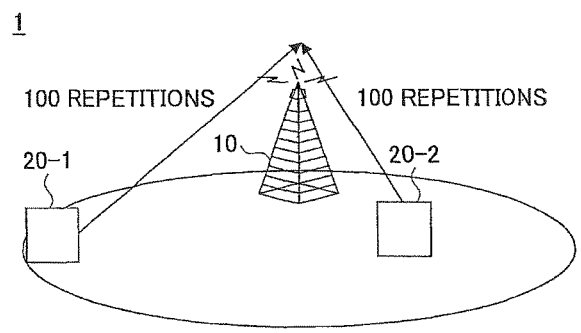
FIG. 1 is a schematic diagram of a radio communication system to which the present invention is applied.

FIG. 1 is a schematic diagram of a radio communication system 1 to which the present invention is applied. FIG. 1 also illustrates a proposal to set the number of repetitions of signal transmission for random access procedure, which proposal has been conceived in a process leading to the present invention.

The radio communication system 1 includes a radio base station (or evolved node B which may be abbreviated as "eNB") 10 and terminal devices 20-1 and 20-2. The terminal devices 20-1 and 20-2 are MTC devices (each of which may be labeled as "MTC-UE") 20. Data collected by the MTC devices 20-1 and 20-2 are transferred via the eNB 10 to a server (not illustrated) on a network. Control information from the server is transmitted via the eNB 10 to the MTC devices 20-1 and 20-2.

Although only MTC devices 20-1 and 20-2 are depicted in FIG. 1 for simplification of illustration, a number of MTC devices 20 are provided in the actual structure. The eNB 10 may be connected to a fiber optic network or an electric feeder line used for power line communication.

When introducing time-domain repetition of signal transmission into a random access procedure, what is first conceived is to define the same number of repetitions for all MTC devices 20-1 and 20-2 that carry out random access procedures. Besides, it is also conceived to define the same number of repetitions for all the messages transmitted and received during the random access procedure.

For example, as illustrated in FIG. 1, hundred times repetition is set equally for the MTC devices 20-1 and 20-2 located in or near the service area of the eNB 10. Hundred times of repetition may be needed for the MTC device 20-1 located at the cell edge to guarantee the coverage; however, ten repetitions may be sufficient for the MTC device 20-2 located near the eNB 10. This means that a more flexible way to set the number of repetitions is demanded.

The same arguments apply to the scenario where the same number of repetitions is set uniformly for all the messages used in the random access procedure.

Figure 2:
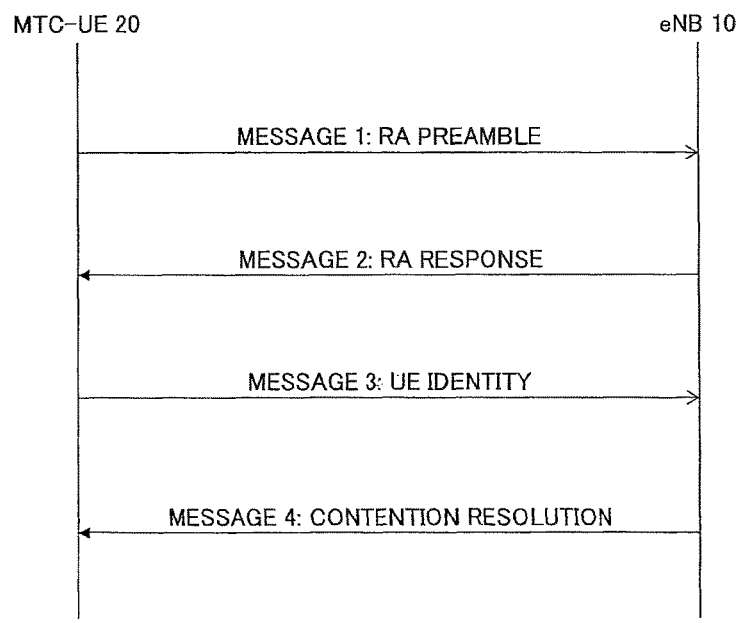
FIG. 2 illustrates messages transmitted and received during random access procedure.

FIG. 2 illustrates a contention-based random access procedure. The MTC device (labeled as MTC-UE) 20 first transmits a random access (RA) preamble in message 1 (Msg1) to establish a connection with the eNB 10. Upon receiving the RA preamble, the eNB 10 transmits an RA response in message 2 (Msg2) on a downlink shared channel.

Upon receiving the RA response, the MTC device 20 transmits a connection request message and a device identity (ID) in message 3 (Msg3) to the eNB 10. The eNB 10 then outputs a contention resolution message in message 4 (Msg4) that contains the device ID.

Figure 3:
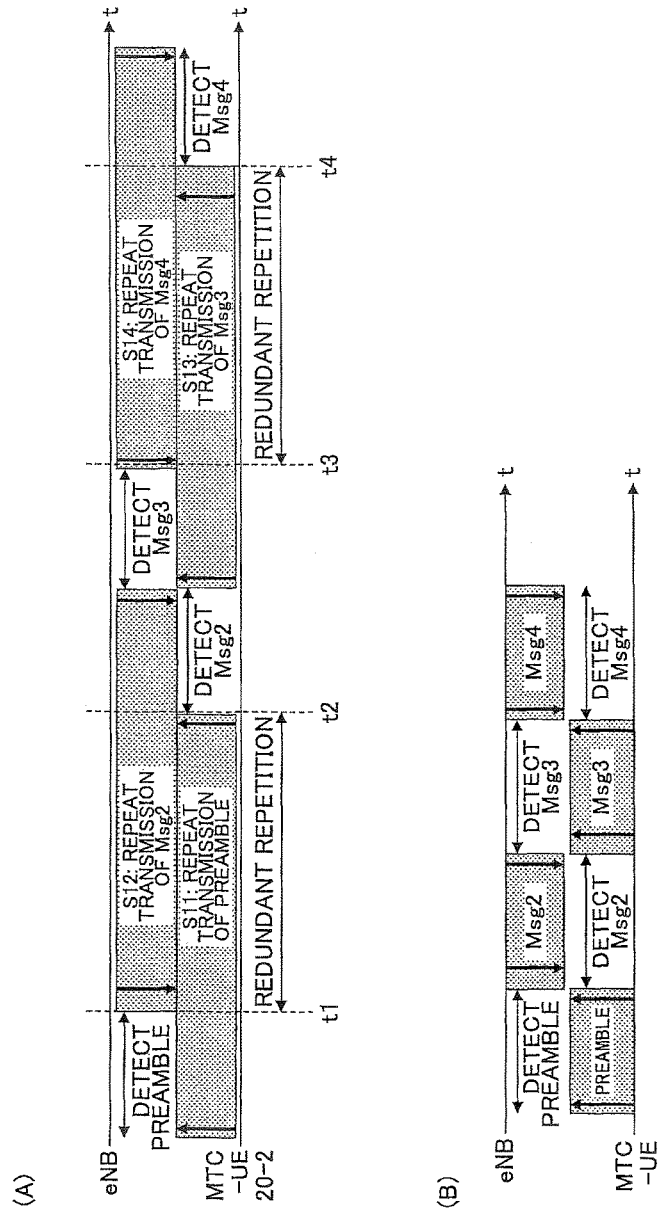
FIG. 3 illustrates inconvenience that may arise in the architecture of FIG. 1 and a technical solution provided by the embodiments.

FIG. 3, part (A) illustrates a scenario in which the same number of repetitions is defined uniformly for all the MTC devices 20-1 and 20-2 and all the messages 1 through 4 of the random access procedure. In this case, the MTC device 20-2 located near the eNB 10 transmits a random access preamble over a RACH the predetermined number of times (S11).

In the satisfactory radio communication environment around the MTC device 20-2, the eNB 10 detects the preamble at time t1 shortly after the starting the repeated transmission of the preamble (Msg1). Then the eNB 10 starts transmitting an RA response (Msg2) repeatedly (S12). However, the MTC device 20-2 continues to transmit the preamble until the predetermined number of transmissions have been finished.

At the time when the MTC terminal 20-2 finishes the predetermined number of transmissions of the preamble, the repeated transmission of the RA response (Msg2) has already begun. The MTC terminal 20-2 starts detection of the RA response (Msg2) in the middle of the RA response procedure. Upon detecting the RA response (Msg2), the MTC device 20-2 starts repeatedly transmitting message 3 containing the device ID to the eNB 10 (S13). The eNB 10 detects the message 3 at time t3 before the predetermined number of transmissions of message 3 is finished (S14).

The MTC device 20-2 repeats transmission of message 3 until transmission reaches the predetermined number of times, and then at time t4, it starts detection of message 4 (S14).

In the above-described example, the MTC device 20-2 repeats redundant transmission of preamble from time t1 to time t2. The eNB 10 also repeats transmission of message 2 uselessly. Similarly, from time t3 to time t4, the MTC device 20-2 unnecessarily repeats transmission of message 3, and eNB 10 repeats transmission of message 4 uselessly.

To solve this problem, the embodiments of the invention propose the architecture illustrated in FIG. 3, part (B) that can reduce redundant transmission and reception of messages and allow the respective MTC devices 20 to promptly establish connection with the eNB 10 or the network.

First Embodiment

Throughout the embodiments, preamble sequences available in the radio communication system are grouped into multiple subsets. Each of the subsets is associated with a power level or strength of a signal received at the MTC device and with the number of repetitions of transmission of the messages of the random access procedure. The correspondence relation is shared between the MTC device and the radio base station (eNB).

FIG. 4 illustrates an example of a mapping table 22 used in the MTC device 20 according to the first embodiment. The eNB 10 also has a mapping table, the major part of which is in common with the mapping table 22, as will be explained below with reference to FIG. 5.

The mapping table 22 describes subsets 22a obtained by segmenting the available preamble sequences into groups, each of the subsets 22a being associated with a received power level 22c at the MTC device 20 and the number of repetitions 22b. The mapping table 22 defines the correspondence relation between the subsets 22a, received power levels 22c, and the number of repetitions 22b. The received power levels 22c are represented by, for example, reference signal received power (RSRP) transmitted from the eNB 10.

By referring to the mapping table 22, the MTC device 20 can specify a subset associated with the received power level at the MTC device 20 itself, and select a preamble sequence from that subset.

For example, when the RSRP level measured at the MTC device 20 is higher than X1, any one of preamble sequences with index numbers 1 through 32 is selected from subset 1. In this case, the number of repetitions for transmitting the RA preamble and messages 2, 3 and 4 is one. The subset 1 may be used at legacy MTC devices or an MTC device 20 that has less necessity for coverage enhancement.

When the RSRP level measured at the MTC device 20 is equal to or lower than X1 but higher than X10, then the MTC device 20 selects subset 2 that includes preamble sequences with index numbers 33 through 44. When a preamble sequence is selected from the subset 2, the number of transmission repetitions is, for example, ten.

Similarly, different subsets are selected according to the measured RSRP ranges, and the number of transmission repetitions is determined corresponding to each of the subsets. At an MTC device 20 with a low RSRP level, which device is, for example, located at a cell edge, subset N that includes preamble indexes 60 through 64 may be selected and a RA preamble sequence is transmitted one hundred times of repetition.

The mapping table furnished in the eNB 10 may be the same as the mapping table 22 of the MTC device 20, or it may describe subsets 22a associated only with the number of repetitions 22b.

By sharing the information about the subsets of preamble sequences associated with the numbers of transmission repetitions between the MTC device 20 and the eNB 10, an appropriate number of transmission repetitions can be determined in common between the MTC device 20 and the eNB 10 in the random access procedure. Because the MTC device 20 can select an appropriate number of repetitions according to the radio environment, redundant repetition of transmission can be reduced.

Figure 5:
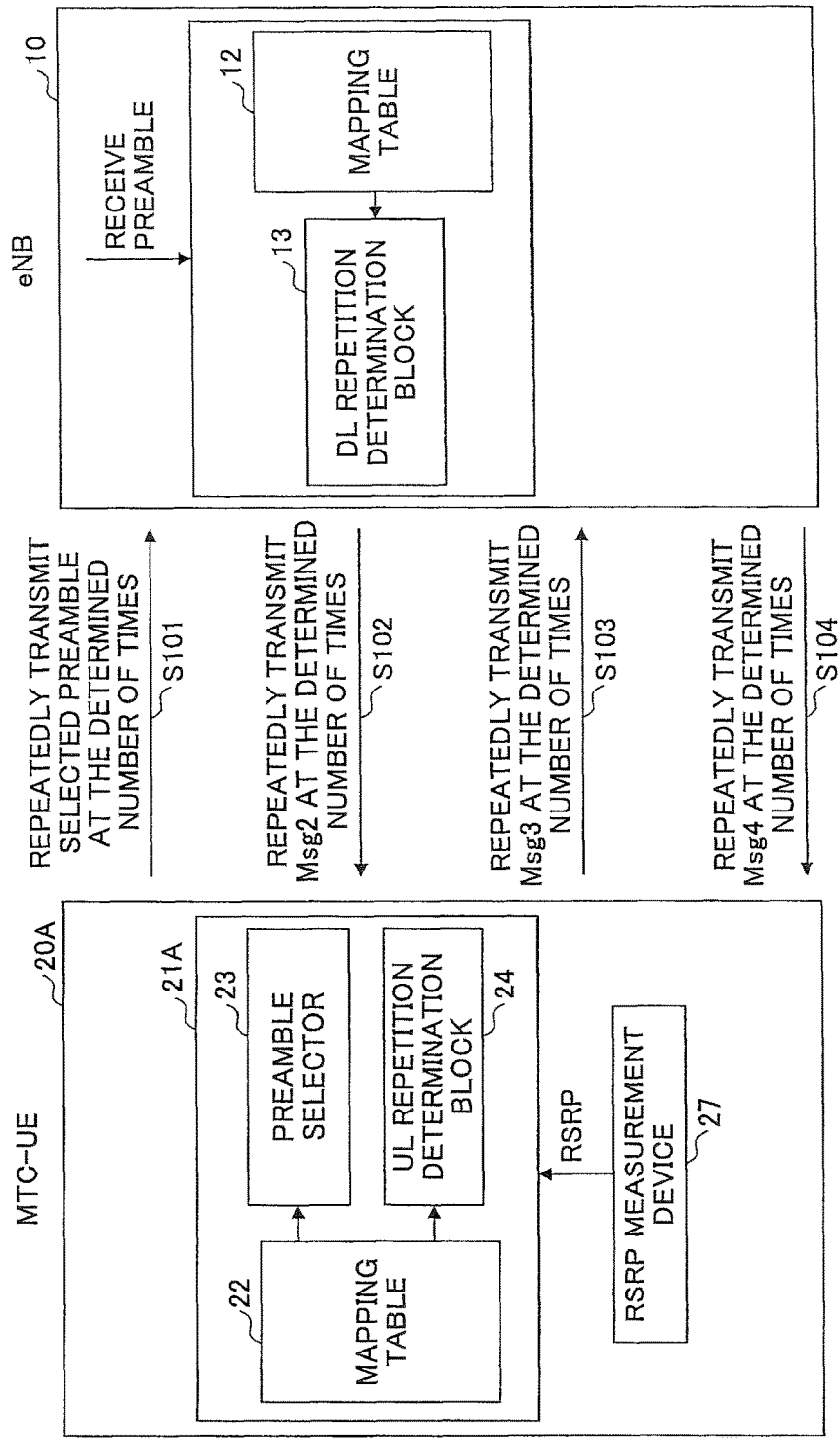
FIG. 5 illustrates exemplified structures of an MTC device and a radio base station (eNB), as well as a random access procedure, according to a first embodiment.

FIG. 5 illustrates exemplified structures of the MTC device (MTC-UE) 20A and the radio base station (eNB) 10, as well as the random access procedure conducted between them, according to the first embodiment.

The MTC device 20A has a random access (RA) controller 21A, and a received power (RSRP) measurement device 27. The RA controller 21A has a mapping table 22 describing subsets of preamble sequences associated with received power levels and the numbers of repetitions. The RA controller 21a also has a preamble selector 23, and an uplink (UL) repetition determination block 24 for determining the number of repetitions of uplink transmission.

The eNB 10 has a mapping table 12 and a downlink (DL) repetition determination block 13 for determining the number of repetitions of downlink transmission. The major part of the mapping table 12 is in common with the mapping table 22, and it describes the correspondence relation between the subsets of preamble sequences and the numbers of repetitions.

The eNB 10 transmits a reference signal (RS) in its service area. The MTC device 20A receives the reference signal from the eNB 10 and measures the received strength of the reference signal at the RSRP measurement device 27 prior to establishing connection with the eNB 10.

The preamble selector 23 of the MTC device 20A refers to the mapping table 22 and selects a subset in accordance with the RSRP measurement level. The UL repetition determination block 24 refers to the mapping table 22 and determines the number of repetitions for uplink transmission.

The MTC device 20A transmits a preamble sequence selected by the preamble selector 23 repeatedly according to the number of repetitions determined by the uplink repetition determination block 24 (S101). For example, if the measured RSRP level is higher than X10 and equal to or lower than X1, a preamble sequence (e.g., a preamble sequence of index number 35) is selected from the subset 2 that includes preamble sequences of index numbers 33 through 40. The selected preamble sequence (RA preamble) is transmitted ten times.

The eNB 10 receives the RA preamble from the MTC device 20A. The downlink repetition determination block 13 refers to the mapping table 12 to specify to which subset the received preamble sequence belongs, and determines the number of repetitions corresponding to that subset. The eNB 10 transmits a message 2 to the MTC device 20A repeatedly the determined number of times, for example, ten times (S102).

Upon receiving the message 2 (RA response), the MTC device 20A transmits a message 3 repeatedly the number of times determined in step S101 (S103). Upon receiving the message 3, the eNB 10 transmits a message 4 repeatedly the number of times determined in step S102 (S104).

Figure 6:
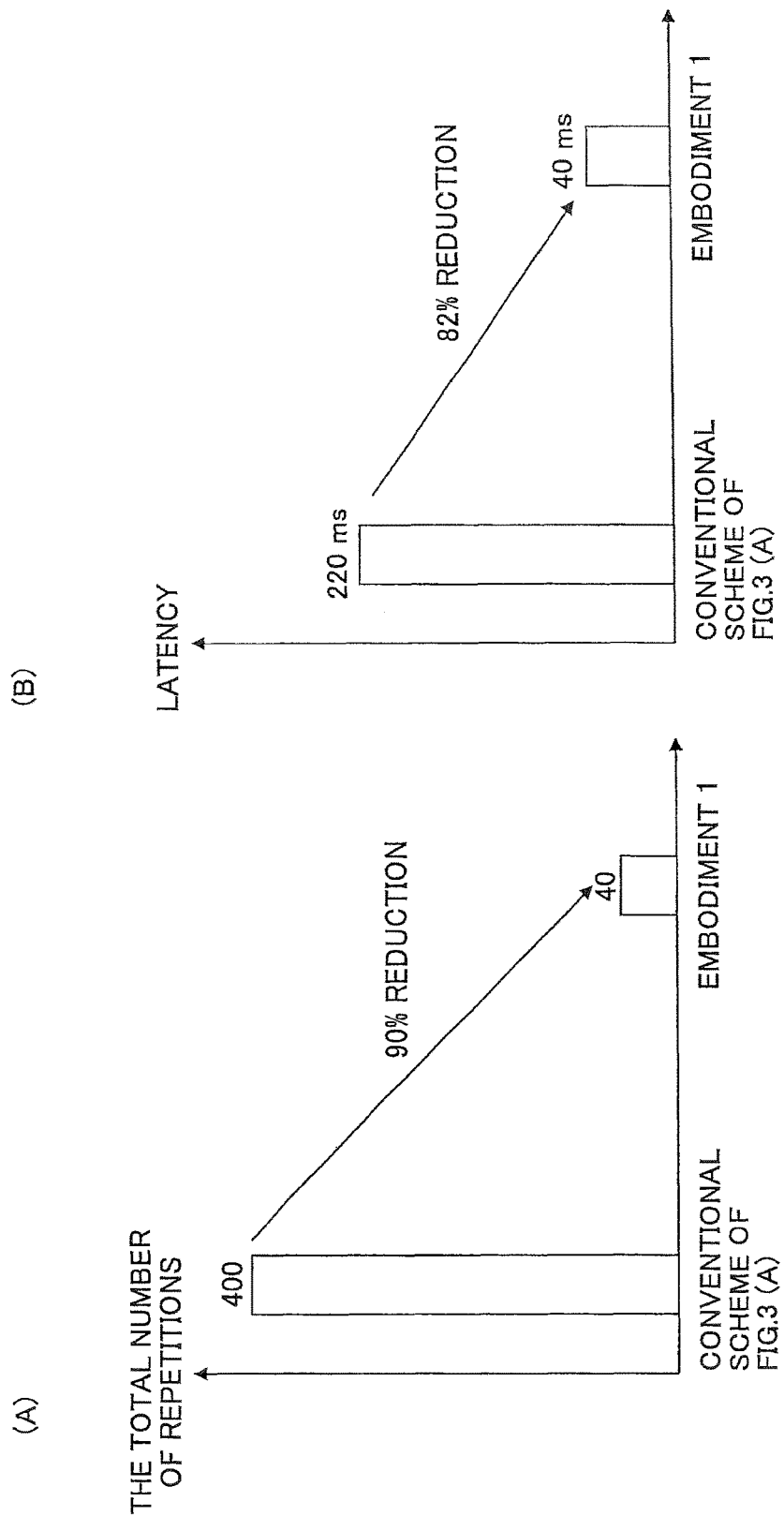
FIG. 6 illustrates an advantageous effect of the first embodiment.

FIG. 6 illustrates an advantageous effect of the first embodiment. The graph (A) indicates the total number of repetitions throughout the random access (RA) procedure of the first embodiment, compared to the scheme of part (A) of FIG. 3. When the repetition number "10" is selected according to the first embodiment, the total number of repetition can be reduced to one tenth ($1/10$) by simple calculation, compared with the scenario where the same number of repetitions is defined regardless of the location or the radio environment of the MTC device 20 as in part (A) of FIG. 3. When the RSRP level measured at the MTC device 20 is low, the rate of decrease may become smaller; however, the total number of repetitions is still reduced greatly compared with the scheme of part (A) of FIG. 3.

The graph (B) of FIG. 6 indicates time (or latency) required for the RA procedure, comparing between the scheme of the first embodiment and that illustrated in part (B) of FIG. 3. When the repetition number "10" is selected according to the first embodiment, the time taken for establishing connection can be reduced 82%, compared to the scheme of part (A) of FIG. 3.

In the first embodiment, MTC device 20A and the eNB 10 are furnished with the mapping table 22 and the mapping table 12 in advance, the major parts of which tables are in common. However, the rules described in the mapping table 22 and the mapping table 12 may be quasi-statistically configured at a higher layer.

The type of the reference signal is not limited and it may include a channel state information reference signal (RSI-RS), a cell-specific reference signal (CRS), a demodulation reference signal (DM-RS), or any reference signal to be newly defined.

Second Embodiment

Figure 8:
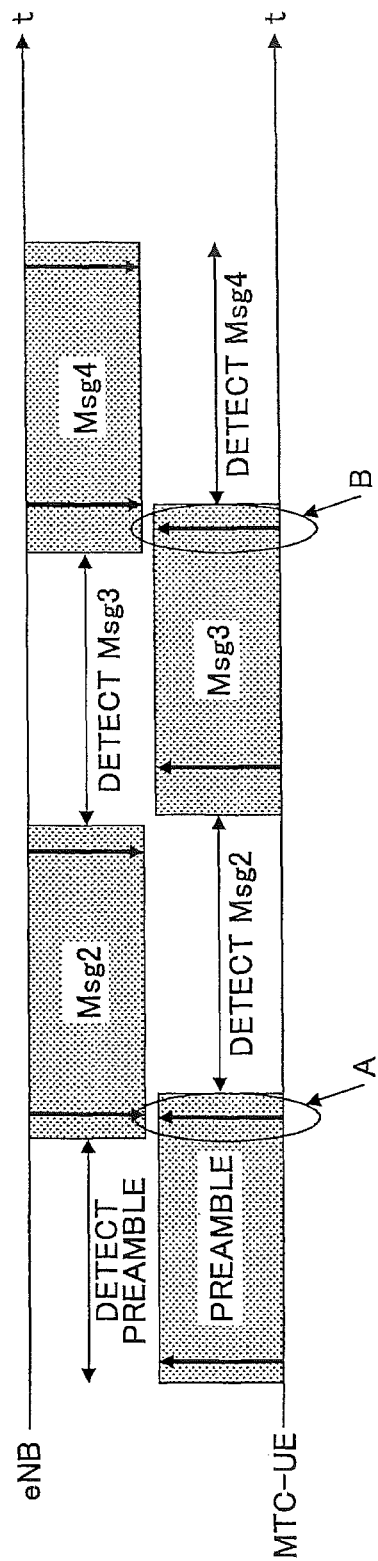
FIG. 8 is a diagram for explaining how the random access channel coverage is further enhanced.
Figure 9:
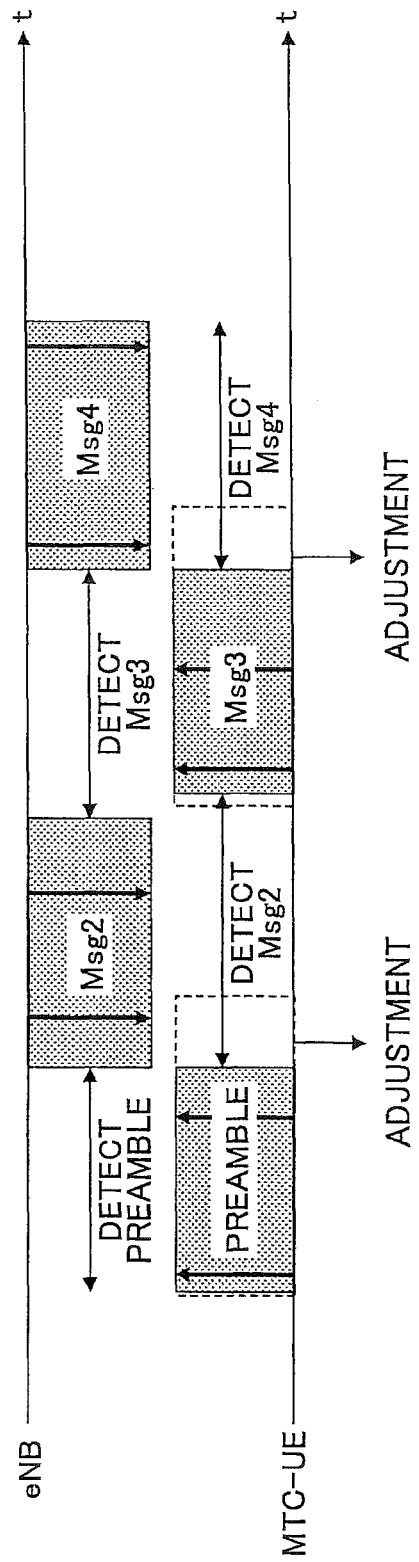
FIG. 9 is a diagram for explaining how the random access channel coverage is further enhanced.

FIG. 7 through FIG. 9 are diagrams to explain a scheme for further enhancing the coverage of random access channels according to the second embodiment.

The mapping table 22 illustrated in FIG. 7 describes subsets of preamble sequences, each subset being associated with an RSRP range and the number of repetitions, as in the first embodiment. This scheme can greatly reduce redundant repetition; however, unnecessary repetition may occur occasionally.

For example, in the scenario illustrated in FIG. 8, a preamble sequence is selected from subset 2 according to the RSRP level, and "10" times of repetition is selected. However, eight times of repetition may be sufficient indeed for transmission of an uplink message.

In this case, redundancy may occur slightly in transmission of an RA preamble and a message 3 as indicated by the circles A and B although such redundancy is trivial.

To address this potential issue and further enhance the coverage of a random access channel, the second embodiment proposes a scheme for appropriately adjusting the number of transmissions of the RA preamble and the message 3 as indicated by the dashed lines in FIG. 9.

FIG. 10 illustrates an example of a mapping table 42 used in a MTC device 20 according to the second embodiment. The eNB 10 of the second embodiment also has a mapping table the major part of which is in common with the mapping table 42, as will be described below.

In the second embodiment, the number of repetitions of an RA preamble and a message 3 transmitted from the MTC device 20 to the eNB 10 is defined separately from the number of repetitions of a message 2 and a message 4 transmitted from the eNB 10 to the MTC device 20.

The mapping table 42 describes subsets 42a obtained by segmenting the available preamble sequences into groups, each of the subsets 42a being associated with a received power level 42c at the MTC device 20, the number of repetitions 42b for the message 2 and the message 4, and the number of repetitions 42d for the RA preamble and the message 3.

When the RSRP level measured at the MTC device 20 exceeds X1, a preamble sequence is selected from a subset 1 that includes preamble sequences of index numbers 1 through 32. In this case, the number of transmissions of the RA preamble and the message 3 is one, and the number of transmissions of the message 2 and the message 4 is also one.

When the RSRP level measured at the MTC device 20 is at or below X1 and higher than X10, the MTC device 20 chooses subset 2 and selects a preamble sequence from those with index numbers 33 through 49. When a preamble sequence of subset 2 is used, the number N of repetitions of the RA preamble and the message 3 is expressed by Formula (1)

$$N = 10 - \left\lfloor \frac{RSRP - X10}{\Delta_1} \right\rfloor, \Delta 1 = \frac{X1 - X10}{9} \quad (1)$$

In Formula (1), adjustment is made to the number of repetitions "10" determined according to the RSRP level based upon a difference between the power level of the actually received reference signal and the lower limit X10 of the RSRP range. The MTC device 20 transmits an RA preamble selected from the subset 2 repeatedly the adjusted number of times. The same applies to transmission of the message 3.

When the RSRP level measured at the MTC device 20 is higher than X20 and lower than or equal to X10, the MTC device 20 chooses subset 3 that includes preamble sequences with index numbers 49 through 59. When a preamble sequence of subset 3 is used, the number N of repetitions for the RA preamble and the message 3 is expressed by Formula (2).

$$N = 20 - \left\lfloor \frac{RSRP - X20}{\Delta_2} \right\rfloor, \Delta 2 = \frac{X10 - X20}{9} \quad (2)$$

In Formula (2), adjustment is made to the number of repetitions "20" determined according to the RSRP level based upon a difference between the power level of the actually received reference signal and the lower limit X20 of the RSRP range.

Similarly, when the RSRP level measured at the MTC device 20 is higher than X30 and lower than or equal to X20, the MTC device 20 chooses subset 4 that includes preamble sequences with index numbers 60 through 64. When a preamble sequence of subset 4 is used, the number N of repetitions for the RA preamble and the message 3 is expressed by Formula (3).

$$N = 30 - \left\lfloor \frac{RSRP - X30}{\Delta_3} \right\rfloor, \Delta 3 = \frac{X20 - X30}{9} \quad (3)$$

In Formula (3), adjustment is made to the number of repetitions "30" determined according to the RSRP level based upon a difference between the power level of the actually received reference signal and the lower limit X30 of the RSRP range.

Upon receiving an RA preamble from the MTC device 20, the eNB 10 refers to the mapping table furnished in the eNB 10 to specify the subset to which the received preamble sequence belongs, and transmits the message 2 repeatedly the corresponding number of times. The same applies to transmission of the message 4.

FIG. 11 illustrates exemplified structures of the MTC device (MTC-UE) 20B and the radio base station (eNB) 10, as well as the random access procedure conducted between them, according to the second embodiment.

The MTC device 20B has a random access (RA) controller 21B, and a received power (RSRP) measurement device 27. The RA controller 21B has a mapping table 42 describing subsets of preamble sequences associated with received power levels and the numbers of repetitions. The RA controller 21B also has a preamble selector 23, an uplink (UL) repetition determination block 24 for determining the number of repetitions of uplink transmission, and an uplink (UL) repetition adjustor 25.

The mapping table 42 may be the same as that illustrated in FIG. 10. Alternatively, the mapping table 42 of FIG. 11 may described subsets 42a, associated only with the RSRP ranges 42c and the numbers of repetitions 42d for transmission of the RA preamble and the message 3.

The eNB 10 has a mapping table 32 and a downlink (DL) repetition determination block 13 for determining the number of repetitions of downlink transmission. The mapping table 32 may be the same as the mapping table 42 of the MTC device 20B, or it may include only subsets 42a and the corresponding numbers of repetitions 42b for the message 2 and the message 4 described in the mapping table 42.

Upon detecting a reference signal transmitted from the eNB 10, the MTC device 20B measures the RSRP level at the RSRP measurement device 27. The preamble selector 23 refers to the mapping table 42 and selects a subset in accordance with the RSRP measurement level. The UL repetition determination block 24 refers to the mapping table 42 and determines the number of repetitions for uplink transmission.

The uplink repetition adjustor 25 adjusts the number of repetitions of RA preamble transmission using the formula described in the mapping table 42 according to the RSRP measurement level.

The MTC device 20B transmits a preamble sequence selected by the preamble selector 23 repeatedly the number of repetitions adjusted by the uplink repetition adjustor 24 (S201).

The eNB 10 receives the RA preamble from the MTC device 20B. The downlink repetition determination block 13 refers to the mapping table 32 to specify to which subset the received preamble sequence belongs, and determines the number of repetitions corresponding to that subset. The eNB 10 transmits rgw message 2 to the MTC device 20B repeatedly the determined number of times (S202).

Upon receiving the message 2 (RA response), the MTC device 20B transmits the message 3 repeatedly the number of times adjusted in step S201 (S203). Upon receiving the message 3, the eNB 10 transmits the message 4 repeatedly the number of times determined in step S202 (S204).

By adjusting the number of repetitions of uplink transmission, the random access procedure approaches the ideal state illustrated in part (B) of FIG. 3.

The technique for adjusting the number of repetitions for the RA preamble and the message 3 illustrated in FIG. 10 is merely an example and arbitrary adjusting methods may be employed. For example, in place of the adjustment of FIG. 10 based upon the difference between the actual level of the received signal and the lower limit of the RSRP range, the difference between the actual receive level and the upper limit of the RSRP range or the difference between the actual receive level and the median of the RSRP range may be used to adjust the repetition number.

Although in the embodiments an MTC terminal is described as an example of the terminal device, the invention can be applied to the random access procedure performed by mobile stations.

This patent application is based upon and claims the benefit of the priority of Japanese Patent Application No. 2013-098878 filed May 8, 2013, which is incorporated herein by references in its entirety.

What is claimed is:

1. A radio communication system comprising: a radio base station; and
a terminal device,
wherein the radio base station and the terminal device are configured to share correspondence information about subsets of preamble sequences obtained by segmenting preamble sequences available in the radio communication system into groups, each of the subsets being associated with a received signal level at the terminal device and a number of repetitions for transmitting the preamble sequences of each of the subsets,
wherein the terminal device is configured to, based upon a receive level of a signal transmitted from the radio base station, select a subset corresponding to the receive level by referring to the correspondence information and transmit a preamble sequence included in the selected subset at the number of repetitions associated with the selected subset, and
wherein upon receiving the preamble sequence from the terminal device, the radio base station is configured to refer to the correspondence information to determine the subset to which the received preamble sequence belongs and determine the number of repetitions associated with the determined subset, and
wherein the radio base station is configured to transmit a response to the terminal device at the determined number of repetitions.

2. The radio communication system according to claim 1, wherein in the correspondence information, the number of repetitions for uplink messages including the preamble sequence and the number of repetitions for downlink messages including the response are separately associated with each of the subsets.

3. The radio communication system according to claim 1, wherein the correspondence information includes adjusting information for adjusting the number of repetitions for transmitting the uplink messages including the preamble sequence, and
wherein the terminal device transmits the uplink messages at the adjusted number of repetitions.

4. The radio communication system according to claim 3, wherein in the correspondence information, each of the subsets is associated with a predetermined range of the received signal level, and
wherein the adjusting information is configured to adjust the number of repetitions based upon an actual measurement value of the signal received at the terminal device and a value expressing said predetermined range of the received signal level.

5. The radio communication system according to claim 2, wherein the correspondence information includes adjusting information for adjusting the number of repetitions for transmitting uplink messages including the preamble sequence, and
wherein the terminal device transmits the uplink messages at an adjusted number of repetitions.

6. The radio communication system according to claim 5, wherein in the correspondence information, each of the subsets is associated with a predetermined range of the received signal level, and
wherein the adjusting information is configured to adjust the number of repetitions based upon an actual measurement value of the signal received at the terminal device and a value expressing said predetermined range of the received signal level.

7. A terminal device used in a radio communication system, comprising:
a measurement device configured to measure a signal strength of a signal transmitted from a radio base station;
a table configured to describe subsets of preamble sequences obtained by segmenting preamble sequences available in the radio communication system into groups, each of the subsets being associated with a received signal strength and a number of repetitions for transmitting the preamble sequences included in each of the subsets;
a controller configured to select one of the subsets associated with the received signal strength based upon a measured signal strength and determine a number of repetitions for transmitting a preamble sequence selected from the subsets, by referring to the table; and
a communication device configured to transmit the selected preamble sequence at the determined number of repetitions,
wherein a major part of the table is in common with a major part of a correspondence table used in the radio base station, and
wherein the communication device is configured to receive a response responding to the preamble sequence and transmitted from the radio base station at the number of repetitions determined from the correspondence table.

8. The terminal device according to claim 7, wherein in the table, the number of repetitions for uplink messages including the preamble sequence and the number of repetitions for downlink messages including the response are separately associated with each of the subsets.

9. The terminal device according to claim 7,
wherein in the table, each of the subsets is associated with a predetermined range of the received signal strength, and
wherein the adjusting information is configured to adjust the number of repetitions based upon an actual measurement value of a signal received at the terminal device and a value expressing said predetermined range of the received signal strength.

10. The terminal device according to claim 7,
wherein the table includes adjusting information for adjusting the number of repetitions for transmitting uplink messages including the preamble sequence, and
wherein the communication device is configured to transmit the uplink messages at an adjusted number of repetitions.

11. The terminal device according to claim 10,
wherein in the table, each of the subsets is associated with a predetermined range of the received signal strength, and
wherein the adjusting information is configured to adjust the number of repetitions based upon an actual measurement value of a signal received at the terminal device and a value expressing said predetermined range of the received signal strength.

12. The terminal device according to claim 8,
wherein the table includes adjusting information for adjusting the number of repetitions for transmitting uplink messages including the preamble sequence, and
wherein the communication device is configured to transmit the uplink messages at an adjusted number of repetitions.

13. The terminal device according to claim 12,
wherein in the table, each of the subsets is associated with a predetermined range of the received signal strength, and
wherein the adjusting information is configured to adjust the number of repetitions based upon an actual measurement value of a signal received at the terminal device and a value expressing said predetermined range of the received signal strength.

* * * * *